United States Patent
DeLuca et al.

(10) Patent No.: US 10,606,894 B2
(45) Date of Patent: Mar. 31, 2020

(54) COGNITIVE SEARCH QUERY VALIDATION

(71) Applicant: INTERNATIONAL BUSINESS MACHINES CORPORATION, Armonk, NY (US)

(72) Inventors: Lisa Seacat DeLuca, Baltimore, MD (US); Stefan A. Gert van der stockt, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 15/593,925

(22) Filed: May 12, 2017

(65) Prior Publication Data

US 2018/0330011 A1  Nov. 15, 2018

(51) Int. Cl.
*G06F 17/30* (2006.01)
*G06F 16/9032* (2019.01)
*G06F 16/951* (2019.01)

(52) U.S. Cl.
CPC ........ *G06F 16/9032* (2019.01); *G06F 16/951* (2019.01)

(58) Field of Classification Search
CPC .................................................. G06F 16/3325
USPC ................................................ 707/760, 761
See application file for complete search history.

(56) References Cited

U.S. PATENT DOCUMENTS

| | | | |
|---|---|---|---|
| 8,650,173 B2 | 2/2014 | McDonald et al. | |
| 8,942,986 B2 | 1/2015 | Cheyer et al. | |
| 9,245,029 B2 | 1/2016 | Musgrove | |
| 9,311,296 B2 | 4/2016 | Heidasch et al. | |
| 2011/0066650 A1 | 3/2011 | Fuxman et al. | |
| 2012/0059813 A1* | 3/2012 | Sejnoha | G06F 16/951 707/707 |
| 2013/0018864 A1* | 1/2013 | Regan | G06F 16/951 707/706 |
| 2013/0018865 A1* | 1/2013 | Regan | G06F 16/487 707/706 |
| 2013/0018867 A1* | 1/2013 | Regan | G06F 9/445 707/707 |
| 2013/0019202 A1* | 1/2013 | Regan | G06F 16/9535 715/810 |

(Continued)

OTHER PUBLICATIONS

Wang, Chi, et al., "Concept Expansion Using Web Tables". Retrieved from Internet URL: <https://www.microsoft.com/en-us/research/wp-content/uploads/2016/02/frp0991-wang.pdf>, May 2015, 11 pgs.

(Continued)

*Primary Examiner* — Baoquoc N To (74) *Attorney, Agent, or Firm* — Isaac Gooshaw, Esq.; George S. Blasiak, Esq.; Heslin Rothenberg Farley & Mesiti P.C.

(57) ABSTRACT

Methods, computer program products, and systems are presented. The methods include, for instance: generating domain language detection models respective to a plurality of domains. A query is mapped to a domain language detection model and intent of the query is determined by use of classification labels of the domain language detection model. Based on the classification labels that may be identified as the intent of the query, alternative queries are formed to be meaningful valid and are produced to a user.

20 Claims, 5 Drawing Sheets

(56) References Cited

U.S. PATENT DOCUMENTS

| | | | |
|---|---|---|---|
| 2013/0086027 A1* | 4/2013 | Hebert | G06F 16/3322 |
| | | | 707/706 |
| 2013/0086028 A1* | 4/2013 | Hebert | G06F 16/3322 |
| | | | 707/706 |
| 2013/0086029 A1* | 4/2013 | Hebert | G06F 16/3325 |
| | | | 707/706 |
| 2014/0025705 A1 | 1/2014 | Barve et al. | |
| 2015/0317302 A1 | 11/2015 | Liu et al. | |
| 2018/0004782 A1* | 1/2018 | Greenwood | G06F 16/2423 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

COGNITIVE SEARCH QUERY VALIDATION

TECHNICAL FIELD

The present disclosure relates to cognitive analysis technology, and more particularly to methods, computer program products, and systems for semantically validating search queries in Internet and World Wide Web environment.

BACKGROUND

In conventional search engine environment, grammar errors and/or misspelled words in queries may be automatically corrected to generate search results and such suggestions may be reported to users for a feedback. Where a senseless query does not have any syntactic errors, the search engine may not generate suggestions for correction, but the search result may not be meaningful at all with respect to the query because the query does not have a clear meaning due to error and/or lack of information on the users submitting the query.

SUMMARY

The shortcomings of the prior art are overcome, and additional advantages are provided, through the provision, in one aspect, of a method. The method for cognitively validating semantics of a query includes, for example: generating, by one or more processor, a plurality of domain language detection models respectively corresponding to each domain from a plurality of domains, wherein the plurality of domain language detection models include respective hierarchies of classification labels applicable for respective content of each domain; obtaining, by the one or more processor, a query as submitted by a user; selecting, by the one or more processor, a domain language detection model applicable to the query from the plurality of domain language detection models; determining, by the one or more processor, intent of the query by use of the domain language detection model from selecting; formulating, by the one or more processor, a preconfigured number of alternative queries based on one or more classification labels corresponding to the intent of the query from the determining, wherein each of the queries is semantically valid; and producing, by the one or more processor, the alternative queries from the formulating to the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
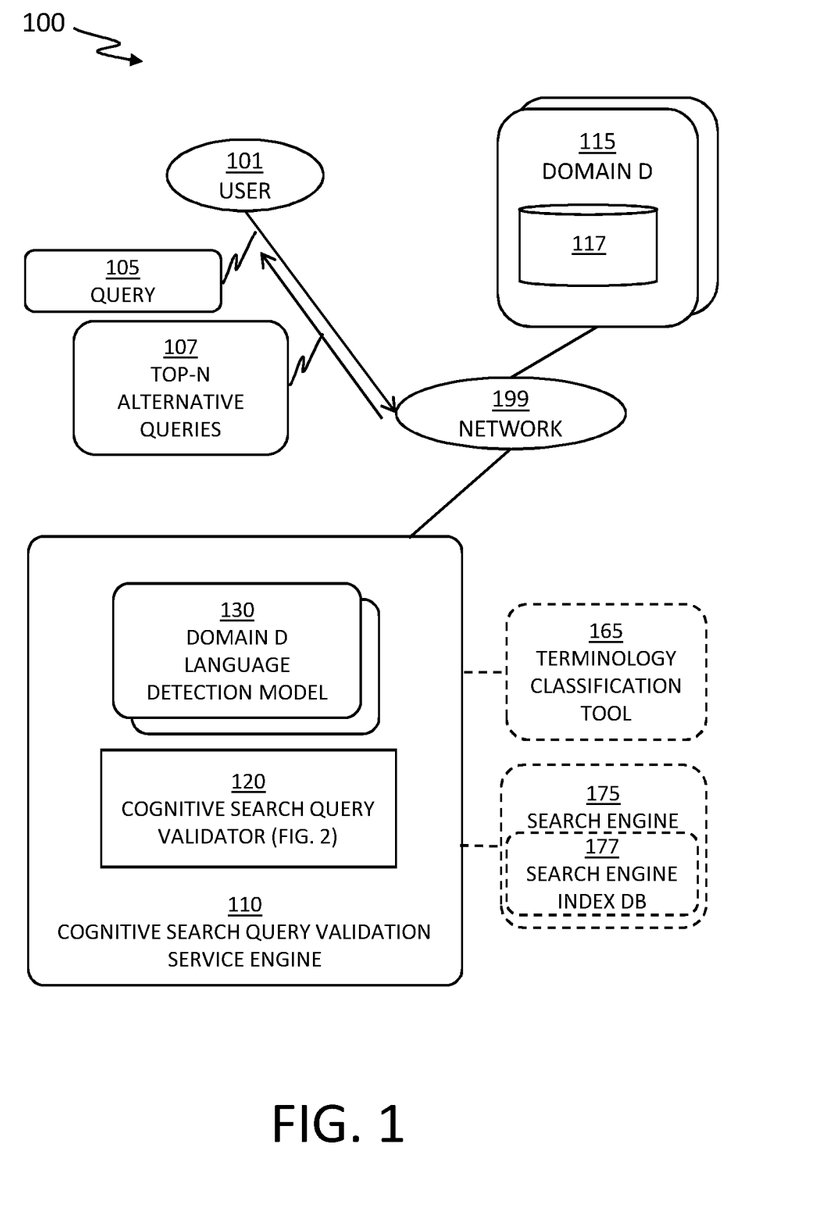
FIG. 1 depicts a system for cognitively validating semantics of a query for search, in accordance with one or more embodiments set forth herein.

FIG. 1 depicts a system 100 for cognitively validating semantics of a query for search, in accordance with one or more embodiments set forth herein.

The system 100 includes a cognitive search query validation service engine 110 that provides search query validation services. The cognitive search query validation service engine 110 is, directly or indirectly via a network 199, coupled to a search engine 175. All components of the system 100 are interconnected by use of the network 199.

A user 101 submits a query 105 to the search engine 175 in order to loop up certain desired information from one or more domain. The user 101 may submits the query 105 to the search engine 175 while visiting a certain domain that utilizes the search engine 175, or directly at a homepage of the search engine 175. Each of the one or more domain has respective content documents representing data and/or items offered from each domain. For a domain implementing a commerce website, the content documents may include, not are not limited to, product lists, product descriptions, manufacturer's specifications, etc. Domain D 115 of the one or more domain has Domain D content documents 117, collectively representing all searchable content documents in Domain D 115.

The search engine 175 includes a search engine index database 177, which is an index of searchable information from the content documents of the one or more domain associated with respective search terms. The search engine index database 177 is a conventional way of promptly locate certain content documents that may be relevant to the search terms of the query 105 without visiting the one or more domain upon receiving the query 105. In cases where the search engine index database 177 does not have a content document associated with search terms from the query 105, the search engine 175 typically scans for misspellings and/or grammatical errors in the query 105 and makes suggestions to the user 101 by use of syntactic auto-correction functionalities, or even displays the content documents corresponding to the suggestions as a result to the query 105 along with a notice that the search result is for the auto-corrected version of the query 105 instead of the query 105 as provided by the user 101.

The cognitive search query validation service engine 110 includes domain language detection models respective to the one or more domain and a cognitive search query validator 120. By use of the domain language detection models, the cognitive search query validator 120 semantically validates the query 105, generates and sends a preconfigured number (N) of domain-specific search suggestions that are most relevant to the query 105, as represented by top-N alternative queries 107, to the user 101. In cases where the search engine 175 discovers that the query 105 is semantically incoherent based on misuse of terms, context mismatches, etc., the search engine 175 sends the query 105 to the cognitive search query validator 120 to semantically validate the query 105. Detailed operations of the cognitive search query validator 120 are presented in FIG. 2 and corresponding description.

The cognitive search query validator 120 builds domain language detection models respectively based on content documents of each domain. Each domain language detection model includes a hierarchy of classification labels for terms appearing in the content documents of corresponding domain. The cognitive search query validator 120 may utilize a terminology classification tool 165 in order to classify terms of the domain content documents. Accordingly, Domain D language detection model 130 is based on the Domain D content documents 117 of Domain D 115. Domain D language detection model 130 includes a hierarchy of classification labels for terms in the Domain D content documents 117. For example, in case where Domain D 115 is an electronics retailer website, Domain D language detection model 130 may be [0: electronics]-[1.1 camera; 1.2 laptop; 1.3 smartphone; . . . ] . . . , and under "camera", there may be [1.1.1 Brand-A; 1.1.2 Brand-B; . . . ], [1.1.1.1 DSLR camera; 1.1.1.2 lenses; . . . ], wherein the terms, which are utilized as classification labels, appearing in the electronics retailer website are hierarchically organized in the electronics retailer website language detection model.

Figure 2:
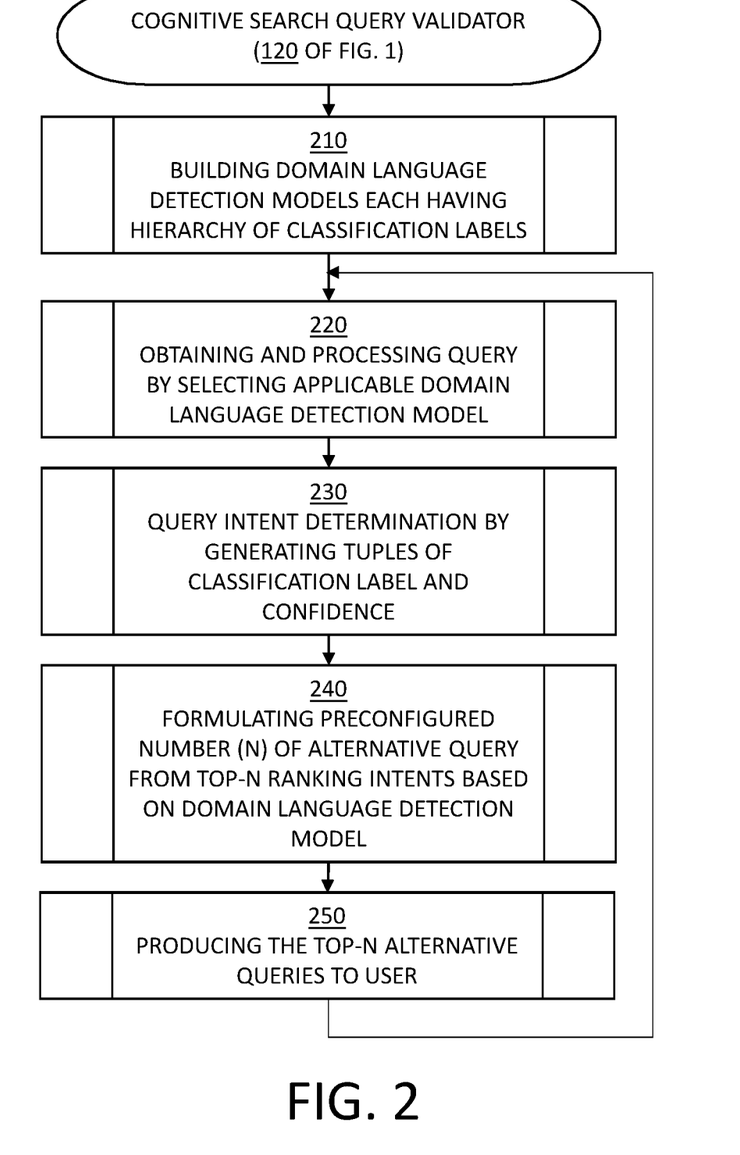
FIG. 2 depicts a flowchart performed by the cognitive search query validator, in accordance with one or more embodiments set forth herein.

FIG. 2 depicts a flowchart performed by the cognitive search query validator 120 of FIG. 1, in accordance with one or more embodiments set forth herein.

In block 210, the cognitive search query validator 120 builds domain language detection models respective to each domain, pursuant to typical language usage for each domain based on content documents such as product description, manufacturer's specifications, etc. The cognitive search query validator 120 classifies, for each domain, terms from content documents of a domain into classification labels by use of available natural language classification technologies such as convolutional neural network (CNN), concept expansion and split criteria function, etc. The cognitive search query validator 120 subsequently organizes the classification labels as a hierarchy suitable for the content of the domain, for each domain. Accordingly, each domain language detection model corresponding to each domain has a hierarchically organized classification labels specific for the words appearing in the content of the domain. In certain embodiments of the present invention, the domain language models may be configured for a periodic rebuilding to adapt with changes in content documents as well as to reflect feedback on alternative queries by the users. Then the cognitive search query validator 120 proceeds with block 220.

In certain embodiments of the present invention, a domain language detection model for a domain may have a two-dimensional hierarchy of classification labels for words appearing in content documents of the domain. For example, the domain language detection model for an electronics retailer website may be a hierarchy of classification labels organized as {product type-level}, such as "camera-high", "audio/video receiver-medium", "laptops-low", etc. Further, the same domain language detection model may have a plurality of sub-classification labels such as aperture, focal length, etc., for the top-level classification of product type-level "camera-high". Classification label hierarchies may be customarily configured to best serve respective domains, according to characteristics of respective product types offered from the respective domains.

In block 220, the cognitive search query validator 120 obtains a query as submitted from a user 101, and selects an applicable domain language detection model. The cognitive search query validator 120 may apply preconfigured domain selection rules such as category/department of the present page open when the user submitted the query, user-selected tags for narrowing searches such as department, price range, brand, etc., and/or a high level topic detector that is presently available in order to detect a topic of the query, and combinations thereof. Accordingly, the cognitive search query validator 120 determines a selected number of domains that fits the best to the preconfigured domain selection rules. The cognitive search query validator 120 subsequently determines respective domain language detection models corresponding to the selected number of domains. Then the cognitive search query validator 120 proceeds with block 230.

In certain embodiments of the present invention, the cognitive search query validator 120 may obtain the query from a search engine, after the search engine failed to generate a proper search result as the intent of the query submitted from the user 101 is unclear. For example, the user 101 who is not familiar with camera terminologies may wish to look up for a new camera equipment by submitting a preposterous and/or incoherent query stating "I want a lens with a 28-85 mm aperture". Because "28-85 mm" range does not correspond with "aperture" of a camera lens, a content document offering the "lens with 28-85 mm aperture" as submitted in the query may not be located by a search engine. Accordingly, the query is submitted to the cognitive search query validation service engine 110, and the cognitive search query validator 120 obtains the query and selects the same domain language detection model for the electronics retailer website as above example from block 210.

In block 230, the cognitive search query validator 120 determines intent of the query by generating a plurality of tuples of probable intent of the query, based on the domain language detection model from block 220. Each tuple includes a classification label and a confidence value corresponding to the classification label. The classification label in a tuple indicates one of the intents that may be meant by the query, and the confidence value represents how probable the query meant the classification label corresponding to the confidence value. Then the cognitive search query validator 120 proceeds with block 240.

In block 240, the cognitive search query validator 120 formulates a preconfigured number (N) of alternative query that may substitute the query received from block 220, by determining top-N classification labels and by presenting the determined classification labels to all domain language detection models from block 210. The candidate number N may be determined as, for example, a 3-7 range. The cognitive search query validator 120 may subsequently receive classification labels from respective domain language detection models, in response to the intent lookup. There may be a few from very large number of classification labels that are matched for the intent lookup, depending on the granularity of the topic represented by the intent. Then the cognitive search query validator 120 orders all received classification labels in descending order of corresponding confidence values, from classification labels associated with the respectively greatest confidence values. The cognitive search query validator 120 subsequently generates the N alternative queries respectively from the top-N instances of classification labels that are associated with the top-N number of confidence values. For example, the cognitive search query validator 120 may receive a list of classification label-confidence value tuples as [(aperture-.35), (focal length-.83), (lenses-.60), (SLR-0.70), (zoom-.82)] upon submitting the query "I want a lens with a 28-85 mm aperture", originally as submitted by the user. In contrast with the query that was originally incoherent, the alternative query is formulated to be semantically valid, that is, to mean something sensible within the domain language detection model, by use of individual classification labels. Then the cognitive search query validator 120 proceeds with block 250.

In certain embodiments of the present invention, the cognitive search query validator 120 may utilize rephrasing of the query originally as submitted by the user, reverse lookup of individual intent as represented by each available classification label, etc. In the exemplary query "I want a lens with a 28-85 mm aperture" as above from block 220, the classification labels available from the domain language detection model for the electronics retailer website may be, but are not limited to, "lens", "28-85 mm" and "aperture". The cognitive search query validator 120 determines that the intent "lens" is consistent with both "28-85 mm" and "aperture", and that no alternative query formulation is necessary.

For the intent "28-85 mm", the cognitive search query validator 120 determines that the intent "lens" is consistent but the intent "aperture" is not consistent, indicating the query originally as submitted by the user is semantically invalid. Accordingly, the cognitive search query validator 120 applies concept expansion in reverse in order to discover one or more classification label corresponding to the intent "28-85 mm". For example, the cognitive search query validation 120 may find classification labels "focal length" and "zoom" having the greatest confidence values within the "camera-high" hierarchy of the domain language detection model for the electronics retailer website.

Similarly for the intent "aperture", the cognitive search query validator 120 determines that the intent "lens" is consistent but the intent "28-85 mm" is not consistent, indicating the query originally as submitted by the user is semantically invalid. Accordingly, the cognitive search query validator 120 applies concept expansion in reverse in order to discover one or more classification label corresponding to the intent "aperture". For example, the cognitive search query validation 120 may find a series of classification labels "f/1.4", "f/2", "f/2.8", etc., having the greatest confidence values within the "camera-high" hierarchy of the domain language detection model for the electronics retailer website. Accordingly, the cognitive search query validation 120 may generate top three alternative queries as "I want a lens with a 12.8 aperture", "I want a lens with a 28-85 mm focal length", and "I want a lens with a 28-85 mm zoom".

In block 250, the cognitive search query validator 120 produces the top-N number of alternative queries generated from block 240 to the user as suggestions to revise the query originally as submitted by the user. In certain embodiments of the present invention, the user may provide feedback as to the accuracies of the alternative queries as formulated, in order to adjust the domain language detection model for a certain domain, and/or to submit one of the alternative queries to a search engine to access content documents as the intent of the query is cleared to generate a proper search result. In certain embodiments of the present invention, the search engine may be configured to preemptively provide search results for the alternative queries along with the notification that the alternative queries have been used for generating the search results. Then the cognitive search query validator 120 terminates processing the query, and loops back to block 220 for processing another query.

Certain embodiments of the present invention may offer various technical computing advantages, including automated construction of domain language detection models by use of natural language analysis and natural language classification technologies. A query is semantically validated according to one of the domain language detection models selected for the query. The intent of the query is determined by selecting a plurality of classification labels of the selected domain language detection models based on terms appearing in the query. Each selected classification labels is associated with a corresponding confidence value which represents a probability of the query being about the topics represented by the respective classification labels. Inconsistent terms in the query are formulated into distinctive alternative queries by use of a selected number of top ranking classification labels from the domain language detection model. The distinctive alternative queries are semantically valid pursuant to the domain language detection model and are presented to the user who submitted the query as suggestions.

By use of multithreading and/or multiprocessing, a plurality of domain language detection models corresponding to each domain may be built, and any number of queries may be simultaneously validated to determine whether or not the queries are meaningful and alternative queries are formulated for each incoherent query. The semantic validation of queries may be implemented by use of a cloud platform/data center, and the semantic validation service may be offered as a subscription-based service for search engines offering domain searches and web searches. Certain embodiments of the present invention improves accuracy and productivity of search engines by reducing a number of searches performed on meaningless queries and may educate users semantically valid usage of terms in certain topics by providing alternative queries that had been formulated according to the domain language detection models.

Figure 3:
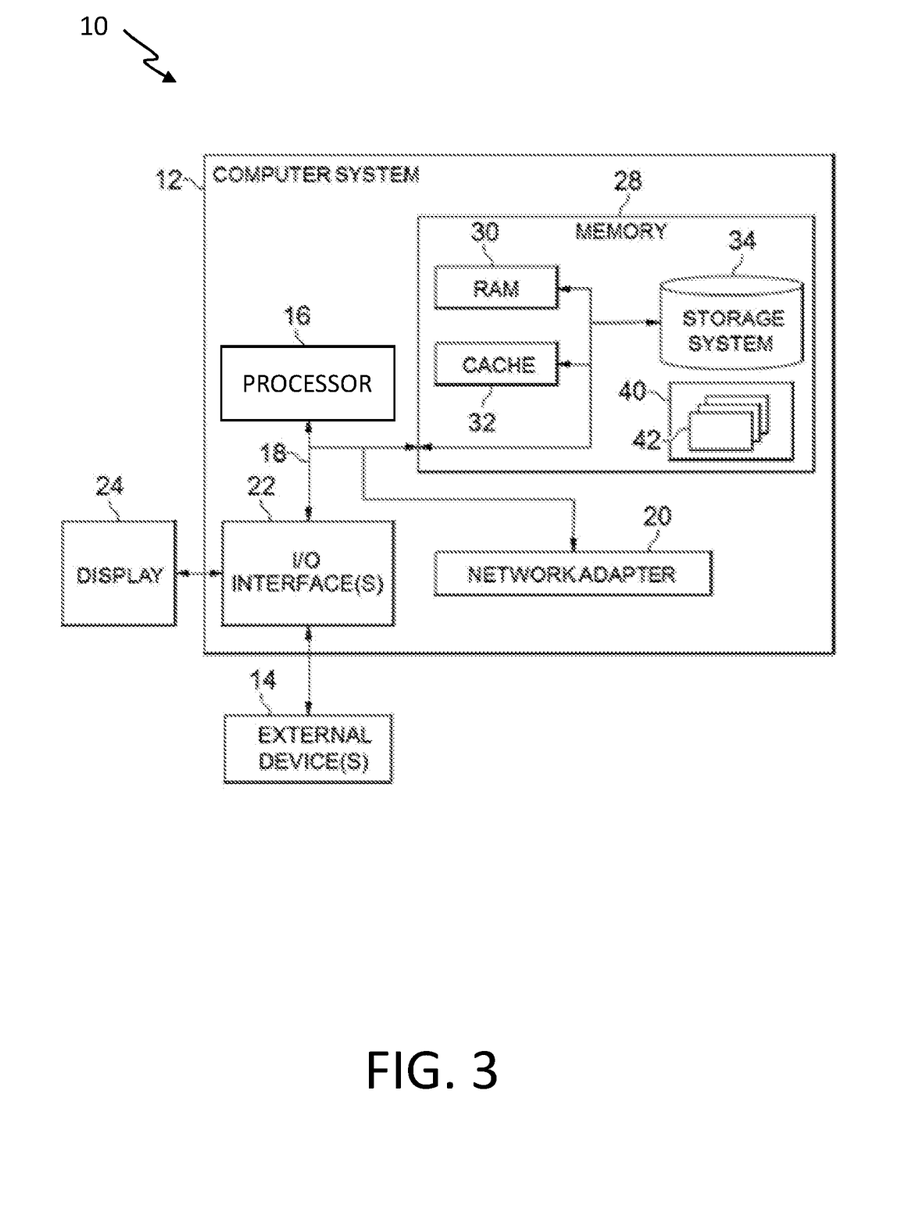
FIG. 3 depicts a cloud computing node according to an embodiment of the present invention.
Figure 4:
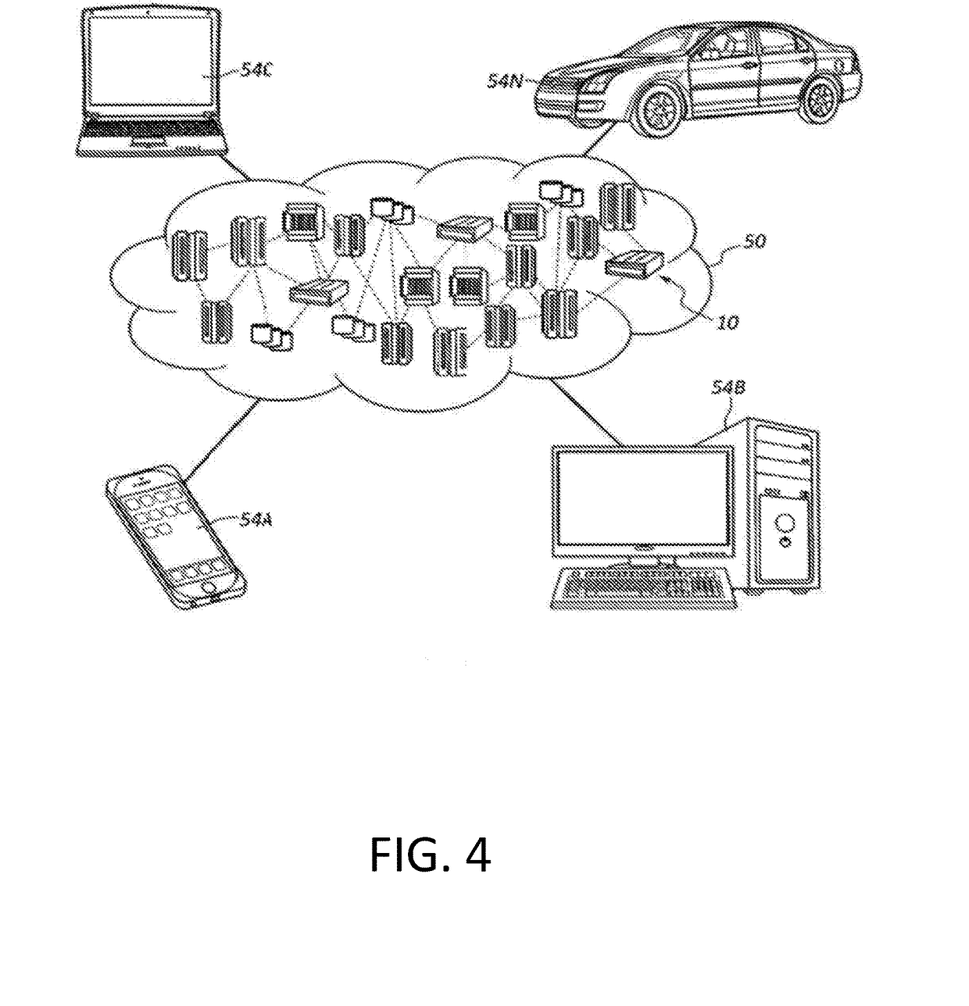
FIG. 4 depicts a cloud computing environment according to an embodiment of the present invention.
Figure 5:
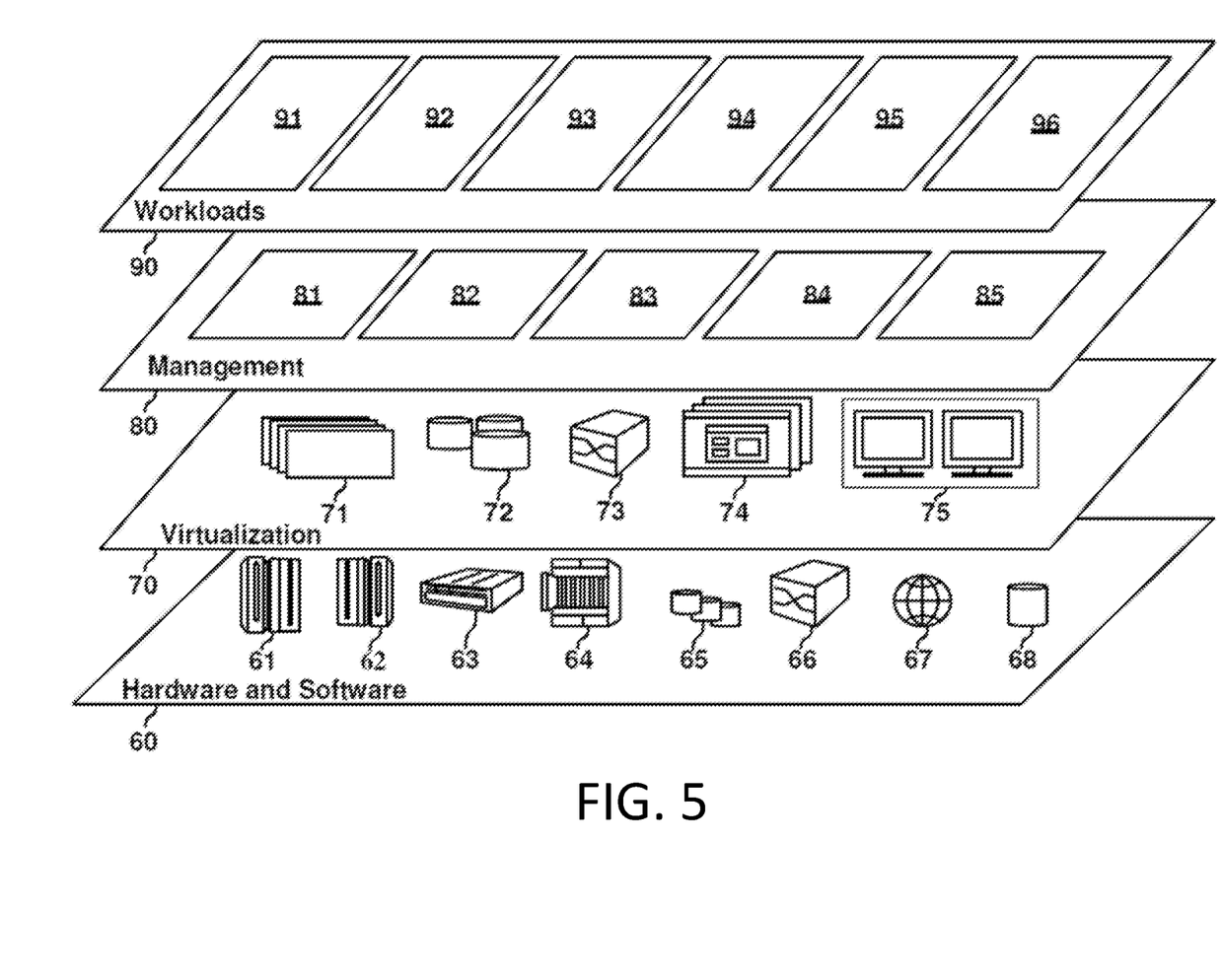
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive search query validator 120 of FIG. 1. Program processes 42, as in the cognitive search query validator 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive search query validator 96, as described herein. The processing components 96 can be understood as one or more program 40 described in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for cognitively validating semantics of a query, comprising:
generating, by one or more processor, a plurality of domain language detection models respectively corresponding to each domain from a plurality of domains, wherein the plurality of domain language detection models include respective hierarchies of classification labels applicable for respective content of each domain;
obtaining, by the one or more processor, a query as submitted by a user;
selecting, by the one or more processor, a domain language detection model applicable to the query from the plurality of domain language detection models;
determining, by the one or more processor, intent of the query by use of the domain language detection model from selecting;
formulating, by the one or more processor, a preconfigured number of alternative queries based on one or more classification labels corresponding to the intent of the query from the determining, wherein each of the queries is semantically valid; and
producing, by the one or more processor, the alternative queries from the formulating to the user.

2. The computer implemented method of claim 1, the generating comprising: associating, respectively, words from content of a domain into classification labels, by use of natural language classification tools; and organizing the classifications labels in a hierarchy suitable for the domain.

3. The computer implemented method of claim 1, the obtaining comprising: receiving the query from a search engine, responsive to sending the query by the search engine as being unsuccessful to generate a search result corresponding to the query.

4. The computer implemented method of claim 1, the selecting comprising: applying preconfigured domain selection rules selected from: a category of a present page from which the query was submitted, a department of the present page, one or more user-selected tags for narrowing a search result responding to the query, a topic of the query as returned by a high level topic detector, and combinations thereof; and determining one of the plurality of domain language detection model amongst respective domain language detection models corresponding to domains that fit best to the preconfigured domain selection rules as the domain language detection models applicable to the query.

5. The computer implemented method of claim 1, the determining comprising: generating a plurality of tuples, wherein each tuple includes a classification label from the domain language detection model and a confidence value, wherein the classification label indicates one of intents that may be meant by the query, and wherein the confidence value indicates how probable the query meant the classification label corresponding to the confidence value.

6. The computer implemented method of claim 1, the formulating comprising: generating a first alternative query from the preconfigured number of alternative queries by use of a first classification label corresponding to the greatest confidence value, and one or more other classification label relevant to the first classification label such that the first alternative query is semantically valid and most likely to mean what the user might have meant by the query.

7. The computer implemented method of claim 1, the producing further comprising: providing a search result corresponding to one of the preconfigured number of alternative queries in association with the preconfigured number of alternative queries.

8. The computer implemented method of claim 1, wherein the generating a plurality of domain language detection models respectively corresponding to each domain from a plurality of domains includes generating a plurality of domain language detection models respectively corresponding to each domain from a plurality of domains, wherein different ones of the plurality of domains are differentiated by subject matter.

9. The computer implemented method of claim 1, wherein the method includes receiving feedback from the user as to the accuracy of the alternative queries, and adjusting a domain language detection model for a certain domain in dependence on the feedback.

10. The computer implemented method of claim 1, wherein the method includes receiving input from the user in response to the alternative queries, and submitting a query of the alternative queries based on the input.

11. The computer implemented method of claim 1, wherein the determining the intent of the query by use of the domain language detection model includes selecting hierarchical classification labels of the domain language detection model based on terms of the query.

12. The computer implemented method of claim 1, wherein a hierarchy of classification labels of the domain language detection model includes (a) a top level having a classification label specifying a general product category, (b) a second level below the top level having classification labels that specify product types within the general product category, and (c) a third level below the second level having classification labels, for a certain product type referenced in the second level, different brands of the certain product type.

13. The computer implemented method of claim 1, wherein a hierarchy of classification labels of the domain language detection model includes (a) a top level having a classification label specifying a general product category, (b) a second level below the top level having classification labels that specify product types within the general product category, and (c) a third level below the second level having classification labels, for a certain product type referenced in the second level, different brands of the certain product type, wherein the determining the intent of the query by use of the domain language detection model includes selecting hierarchical classification labels of the domain language detection model based on terms of the query, wherein the method includes receiving feedback from the user as to the accuracy of the alternative queries, and adjusting a domain language detection model for a certain domain in dependence on the feedback, wherein the method includes receiving input from the user in response to the alternative queries, and submitting a query of the alternative queries based on the input, wherein the formatting includes generating a first alternative query from the preconfigured number of alternative queries by use of a first classification label corresponding to the greatest confidence value, and one or more other classification label relevant to the first classification label such that the first alternative query is semantically valid and most likely to mean what the user might have meant by the query, wherein the determining comprises generating a plurality of tuples, wherein each tuple includes a classification label from the domain language detection model and a confidence value, wherein the classification label indicates one of intents that may be meant by the query, and wherein the confidence value indicates how probable the query meant the classification label corresponding to the confidence value.

14. A computer program product comprising:
a computer readable storage medium readable by one or more processor and storing instructions for execution by the one or more processor for performing a method for cognitively validating semantics of a query, comprising:
generating a plurality of domain language detection models respectively corresponding to each domain from a plurality of domains, wherein the plurality of domain language detection models include respective hierarchies of classification labels applicable for respective content of each domain;
obtaining a query as submitted by a user;
selecting a domain language detection model applicable to the query from the plurality of domain language detection models;
determining intent of the query by use of the domain language detection model from selecting;
formulating a preconfigured number of alternative queries based on one or more classification labels corresponding to the intent of the query from the determining, wherein each of the queries is semantically valid; and
producing the alternative queries from the formulating to the user.

15. The computer program product of claim 14, the generating comprising: associating, respectively, words from content of a domain into classification labels, by use of natural language classification tools; and organizing the classifications labels in a hierarchy suitable for the domain.

16. The computer program product of claim 14, the obtaining comprising: receiving the query from a search engine, responsive to sending the query by the search engine as being unsuccessful to generate a search result corresponding to the query.

17. The computer program product of claim 14, the selecting comprising: applying preconfigured domain selection rules selected from: a category of a present page from which the query was submitted, a department of the present page, one or more user-selected tags for narrowing a search result responding to the query, a topic of the query as returned by a high level topic detector, and combinations thereof; and determining one of the plurality of domain language detection model amongst respective domain language detection models corresponding to domains that fit best to the preconfigured domain selection rules as the domain language detection models applicable to the query.

18. The computer program product of claim 14, the determining comprising: generating a plurality of tuples, wherein each tuple includes a classification label from the domain language detection model and a confidence value, wherein the classification label indicates one of intents that may be meant by the query, and wherein the confidence value indicates how probable the query meant the classification label corresponding to the confidence value.

19. A system comprising:
a memory;
one or more processor in communication with the memory; and
program instructions executable by the one or more processor via the memory to perform a method for cognitively validating semantics of a query, comprising:
generating a plurality of domain language detection models respectively corresponding to each domain from a plurality of domains, wherein the plurality of domain language detection models include respective hierarchies of classification labels applicable for respective content of each domain;
obtaining a query as submitted by a user;
selecting a domain language detection model applicable to the query from the plurality of domain language detection models;
determining intent of the query by use of the domain language detection model from selecting;
formulating a preconfigured number of alternative queries based on one or more classification labels corresponding to the intent of the query from the determining, wherein each of the queries is semantically valid; and
producing the alternative queries from the formulating to the user.

20. The system of claim 19, the formulating comprising: generating a first alternative query from the preconfigured number of alternative queries by use of a first classification label corresponding to the greatest confidence value, and one or more other classification label relevant to the first classification label such that the first alternative query is semantically valid and most likely to mean what the user might have meant by the query.

* * * * *